(12) United States Patent
Tai et al.

(10) Patent No.: US 7,889,301 B2
(45) Date of Patent: Feb. 15, 2011

(54) ARRAY SUBSTRATE ADOPTED FOR LIQUID CRYSTAL DISPLAY DEVICE COMPRISING INSULATING LAYER HAVING FREE ENDS IN SPECIFIC PROFILE

(75) Inventors: Chia-Chun Tai, Hsinchu (TW); Pei-Yi Shen, Hsinchu (TW); Hsin-Yi Lai, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 436 days.

(21) Appl. No.: 12/124,363

(22) Filed: May 21, 2008

(65) Prior Publication Data

US 2009/0174858 A1   Jul. 9, 2009

(30) Foreign Application Priority Data

Jan. 7, 2008   (TW) ............................... 97100582 A

(51) Int. Cl.
G02F 1/1335  (2006.01)
G02F 1/1333  (2006.01)

(52) U.S. Cl. ...................... 349/138; 349/114
(58) Field of Classification Search ............. 349/54, 349/55, 138, 192, 114
See application file for complete search history.

(56) References Cited

U.S. PATENT DOCUMENTS

| | | | |
|---|---|---|---|
| 6,940,095 B2 | 9/2005 | Hung | |
| 2001/0024257 A1* | 9/2001 | Kubo et al. | 349/138 |
| 2005/0237455 A1* | 10/2005 | Fujioka et al. | 349/114 |
| 2006/0125985 A1 | 6/2006 | Chen | |
| 2006/0139525 A1 | 6/2006 | Ahn et al. | |
| 2007/0079657 A1 | 4/2007 | Moteki et al. | |
| 2007/0103625 A1 | 5/2007 | Masutani et al. | |

FOREIGN PATENT DOCUMENTS

| | | |
|---|---|---|
| JP | 2007127837 | 5/2007 |
| TW | 578123 | 3/2004 |
| TW | 595000 | 6/2004 |
| TW | 200636330 | 10/2006 |

(Continued)

OTHER PUBLICATIONS

English language translation of abstract of TW 578123 (pp. 3-4 of publication), Mar. 1, 2004.

(Continued)

*Primary Examiner*—Mark A Robinson
*Assistant Examiner*—Michael Inadomi
(74) *Attorney, Agent, or Firm*—Thomas, Kayden, Horstemeyer & Risley, LLP

(57) ABSTRACT

An array substrate adopted for a liquid crystal display (LCD) device and the liquid crystal display device are provided. The array substrate includes a substrate, a plurality of scan lines, a plurality of data lines, a plurality of switching devices, and an insulating layer, wherein the insulating layer is deposited above the scan lines and the data lines, and has a plurality of free ends. A pair of the free ends faces each other and defines a broken region, and each free end has a tilt down profile with a decreasing width facing the broken region. The profile can avoid the short circuiting between the two adjacent array pixels, which is caused by the residual reflective electrode during the process.

12 Claims, 10 Drawing Sheets

FOREIGN PATENT DOCUMENTS

| TW | 200720866 | 6/2007 |
|----|-----------|--------|
| TW | 200727482 | 7/2007 |

OTHER PUBLICATIONS

English language translation of abstract of TW 200727482 (pp. 3-4 of publication), Jul. 16, 2007.

English language translation of abstract of TW 200636330 (p. 3 of publication), Oct. 16, 2006.

English language translation of abstract of TW 200720866 (p. 4 of publication), Jun. 1, 2007.

English language translation of abstract of TW 595000 (pp. 3-5 of publication), Jun. 21, 2004.

* cited by examiner

ARRAY SUBSTRATE ADOPTED FOR LIQUID CRYSTAL DISPLAY DEVICE COMPRISING INSULATING LAYER HAVING FREE ENDS IN SPECIFIC PROFILE

This application claims priority to Taiwan Patent Application No. 097100582 filed on Jan. 7, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to an array substrate and a liquid crystal display device using the same. More particularly, the invention relates to an array substrate which prevents the short circuiting of the inner pixels and a liquid crystal display device using the same.

2. Descriptions of the Related Art

The liquid crystal display (LCD) has gradually replaced the conventional cathode ray tube display (CRT display) due to its many advantages such as thinness, light weight, low power consumption, and no radioactive pollution. Therefore, LCDs have been used in display screens of multimedia electronic products, such as notebook computers, mobile phones, digital cameras, and personal digital assistants (PDAs).

When an LCD displays an image in a mode where light comes from the backlight module and is transmitted through a color filter, the LCD is called a "transmissive type LCD". However, the backlight module consumes a lot of power in the transmissive type LCD. The brighter the transmissive type LCD display is, the more power the backlight module consumes. Moreover, under bright environments, the displayed images are prone to interference from external light, and therefore may render the images unclear. On the contrary, a "reflective type LCD" displays an image by reflecting ambient light. Although such an LCD may save power, the LCD exhibits a poor contrast ratio and a degraded color saturation, and cannot display images clearly under dark conditions. To overcome these problems, a "transflective type LCD" is carried out as a compromise between the transmissive type LCD and the reflective type LCD. Since the transflective type LCD uses both backlight and natural or artificial light, it may be applied in many circumstances. The transflective type LCD consumes less power compared to the transmissive LCD.

The general structure of the transflective type LCD, from bottom to top, comprises a backlight panel, a lower polarizer, an array substrate, a liquid crystal layer, a color filter, an opposing electrode substrate, and an upper polarizer. The top view and three cross-sectional views of different sections are shown in FIG. 1A, FIG. 1B, FIG. 1C, and FIG. 1D, respectively. FIG. 1B is a cross-sectional view along line A-A' in the array substrate of FIG. 1A; FIG. 1C is a cross-sectional view along line B-B' in the array substrate of FIG. 1A; and FIG. 1D is a cross-sectional view along line C-C' in the array substrate of FIG. 1A. As shown in FIG. 1A, an array substrate 1 comprises a substrate 101, a plurality of scan lines 103, a plurality of data lines 105, a first dielectric layer 1013, a second dielectric layer 107, an insulating layer 109, a plurality of transmissive electrode layers 111, a plurality of reflective electrode layers 113, a plurality of switching devices 117, and a third dielectric layer 135.

When producing the array substrate 1, the insulating layer 109 will be deposited above the third dielectric layer 135 (as shown in FIG. 2A) in advance to compensate for the optical path difference between the transmissive electrode layer 111 and the reflective electrode layer 113 of the array substrate 1. The reflective electrode layer 113 will be deposited above the insulating layer 109, i.e. coating (as shown in FIG. 2B). Next, a photoresist 115 will be applied on the reflective electrode layer 113 and an exposing step will be conducted to pattern the photoresist 115 (as shown in FIG. 2C). Then, a developing step will be conducted to remove unnecessary photoresist 115 (as shown in FIG. 2D), followed by etching, and, finally, removing the entire photoresist 115.

However, as shown in FIG. 2D, in the process of developing and removing the unnecessary photoresist 115, the photoresist 115 remains due to problems such as the angle of the photoresist 115 being deposited above the insulating layer 109 in the aforementioned step and the structure design of the insulating layer 109 itself. If the photoresist 115 remains, the reflective electrode layer 113' is prone to stay in a region between two adjacent array pixel areas 121 in the following process of etching the reflective electrode layer 113 (as shown in FIG. 1A and FIG. 2E). The residual reflective electrode layer 113' will cause the electrode to short circuit between two adjacent array pixel areas 121.

In summary, due to the bad design of existing structure, the electrode short circuiting between two array pixels will affect the productivity of LCDs. Therefore, it is important to prevent the residual of the reflective electrode, which further causes the electrode to short circuit between the two array pixels.

SUMMARY OF THE INVENTION

One objective of the invention is to provide an array substrate adapted for a liquid crystal display device, comprising a substrate, a plurality of scan lines, a plurality of data lines, a plurality of switching devices, and an insulating layer. The scan lines are substantially perpendicular to the data lines. The scan lines and the data lines are located on the substrate to define a plurality of array pixel areas. The switching devices are individually connected to the scan lines and the data lines. The insulating layer is formed above the scan lines and the data lines. The insulating layer has a plurality of free ends, wherein a pair of the free ends faces each other and defines a broken region. Each of the free ends has a tilt down profile with a decreasing width facing the broken region.

Another objective of the invention is to provide a liquid crystal display device, comprising an opposing substrate, a described array substrate, and a liquid crystal layer. The described array substrate is disposed opposite to the opposing substrate. The liquid crystal layer is filled between the described array substrate and the opposing substrate.

In the array substrate according to the invention, each free end of the insulating layer has a tilt down profile with a decreasing width facing the broken region. This tilt down profile can prevent the varying deposit due to the angle and the structure of the insulating layer when the photoresist is exposed. As a result, when developing and removing the unnecessary photoresist, the remained photoresist and therefore, the remained reflective electrode will cause the short circuit problem between the two adjacent array pixel areas.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
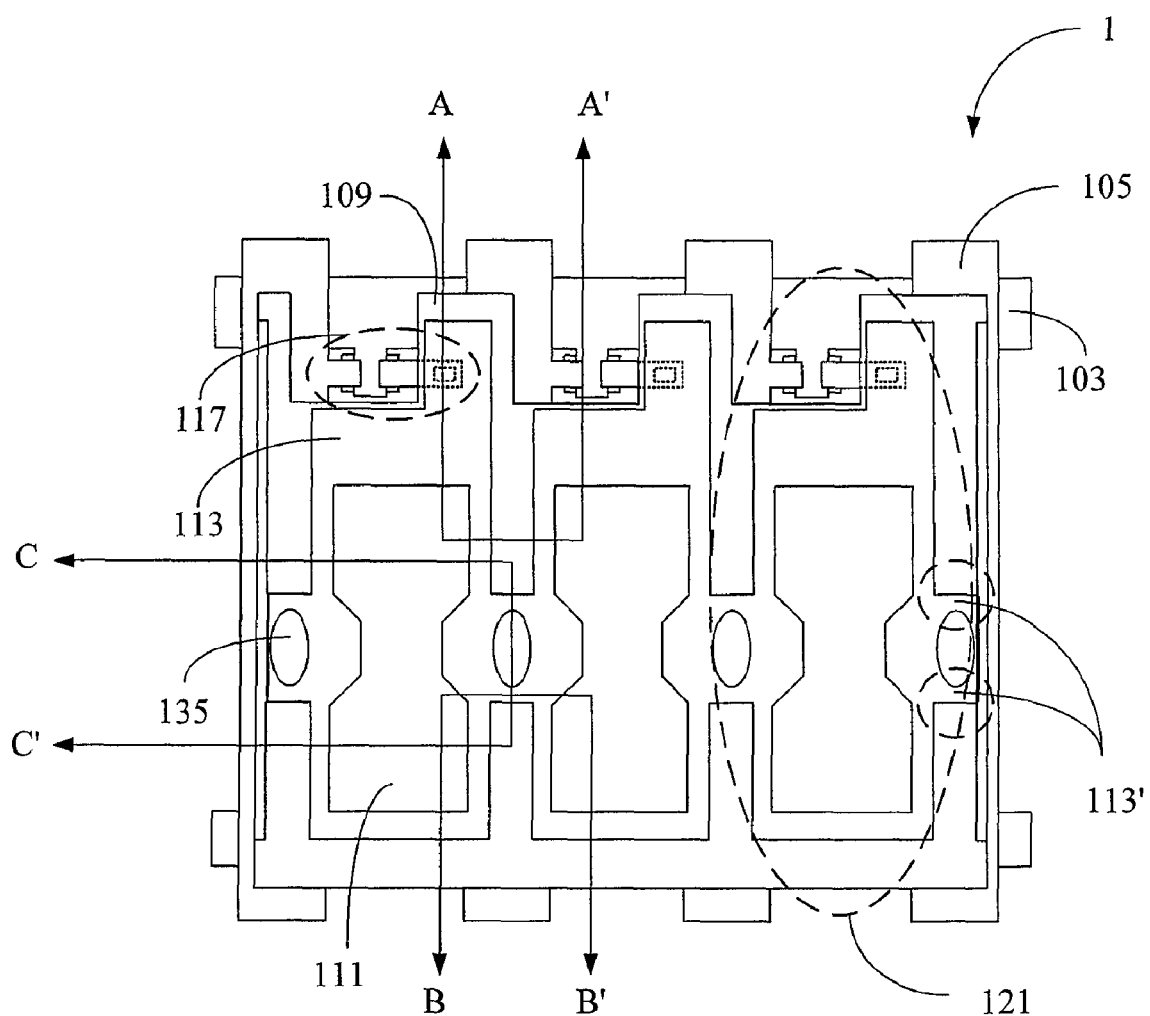
FIG. 1A is a schematic drawing of an array substrate according to the prior art.
Figure 1B:
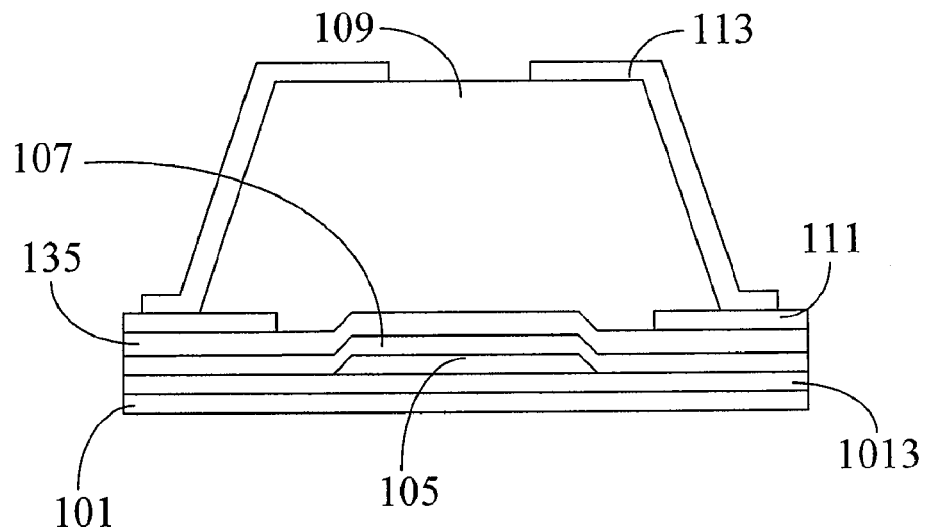
FIG. 1B is a cross-sectional view along line A-A' in the array substrate of FIG. 1A.
Figure 1C:
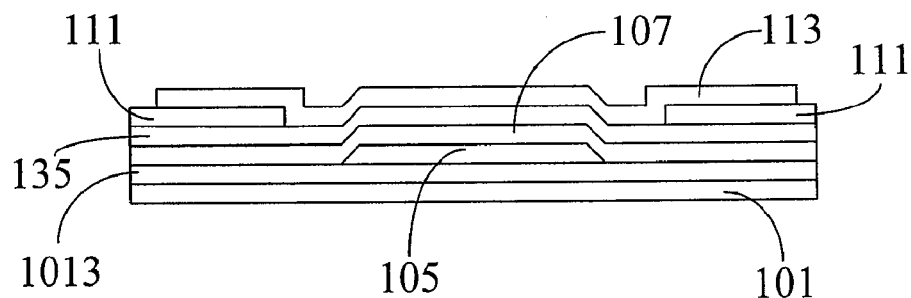
FIG. 1C is a cross-sectional view along line B-B' in the array substrate of FIG. 1A.
Figure 1D:
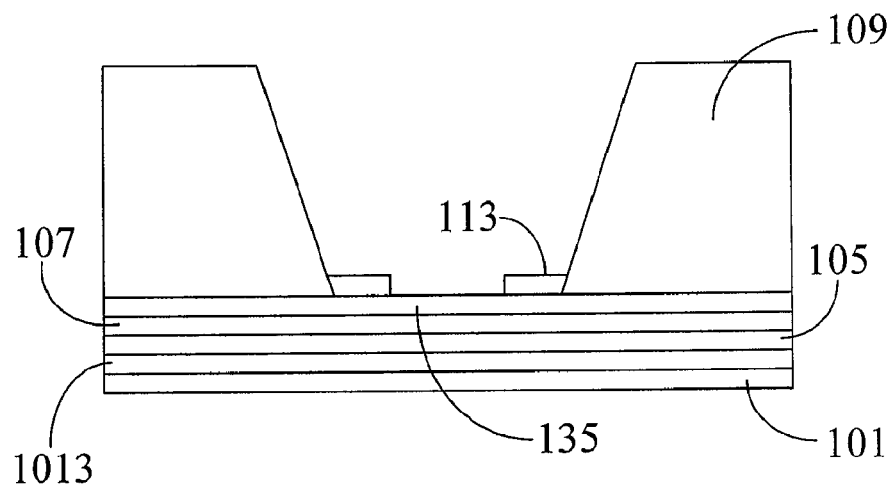
FIG. 1D is a cross-sectional view along line C-C' in the array substrate of FIG. 1A.
Figure 2A:
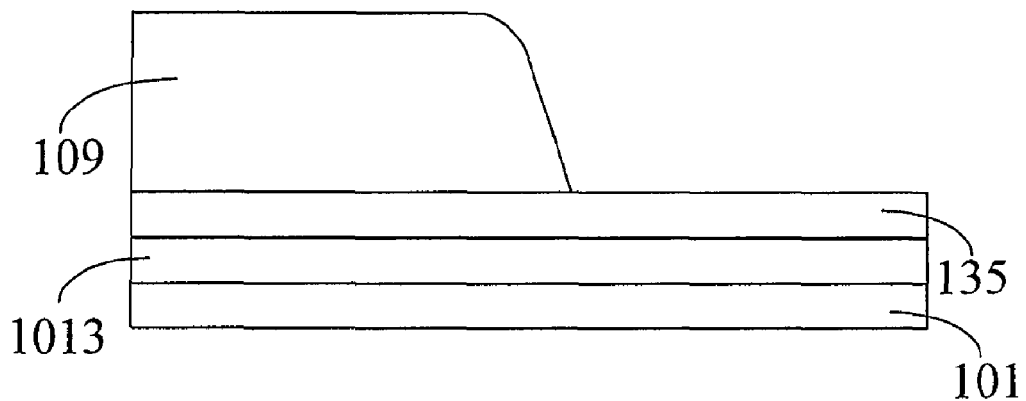
FIG. 2A is a schematic drawing of the deposited insulating layer according to the prior art.
Figure 2B:
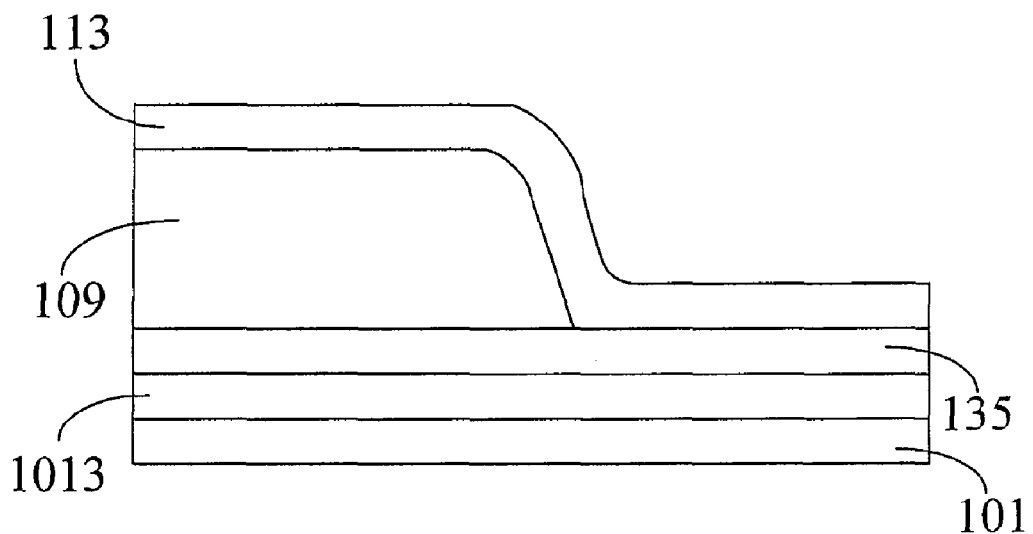
FIG. 2B is a schematic drawing of the coating according to the prior art.
Figure 2C:
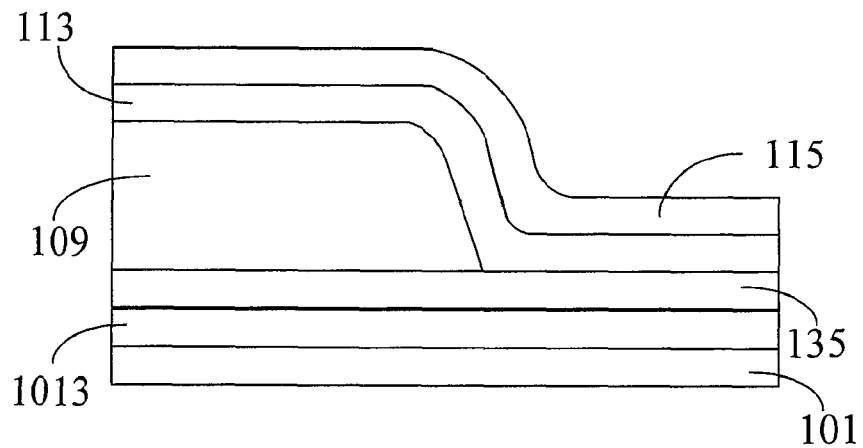
FIG. 2C is a schematic drawing of the applied photoresist according to the prior art.
Figure 2D:
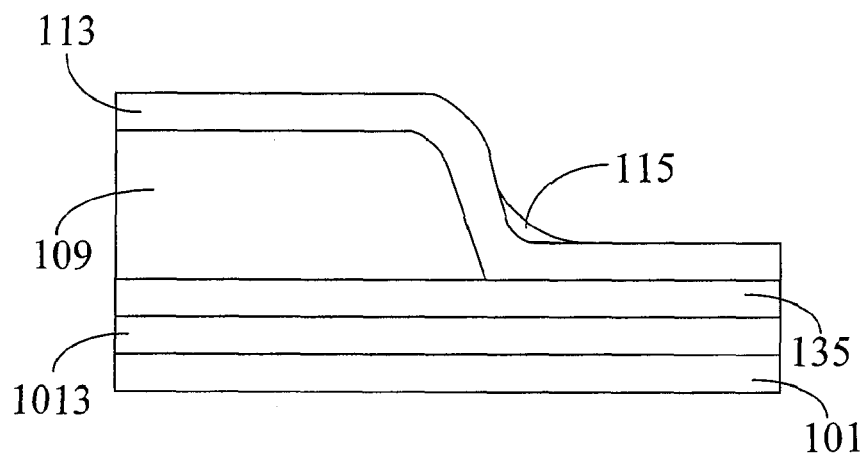
FIG. 2D is a schematic drawing of the residual photoresist after the removal of the unnecessary photoresist according to the prior art.
Figure 2E:
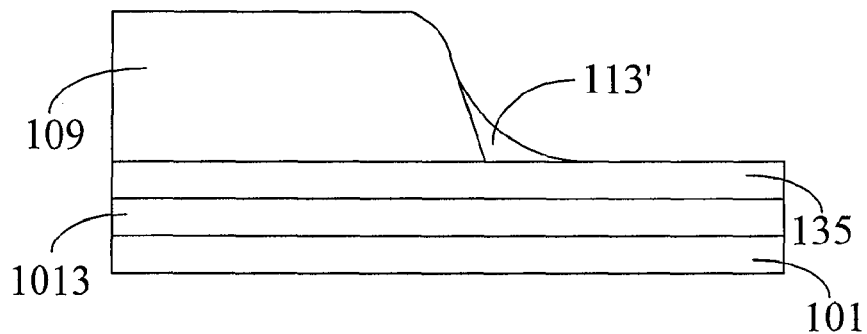
FIG. 2E is a schematic drawing of the residual reflective electrode after the etching according to the prior art.

The following will describe the detailed technology and preferred embodiments implemented for the subject invention with the aid of figures. However, the invention also may be embodied in other embodiments or other examples and should not be limited to the embodiments described in the specification.

A first embodiment of the invention is an array substrate 3. Particularly, it is an array substrate 3 adapted for a liquid crystal display device. The top view and three cross-sectional views of different sections are showing in FIG. 3A, FIG. 3B, FIG. 3C and FIG. 3D, respectively. FIG. 3B is a cross-sectional view along line D-D' in the array substrate 3 of FIG. 3A; FIG. 3C is a cross-sectional view along line E-E' in the array substrate 3 of FIG. 3A; and FIG. 3D is a cross-sectional view along line F-F' in the array substrate 3 of FIG. 3A. The array substrate 3 comprises a substrate 301, a plurality of scan lines 303, a plurality of data lines 305, a first dielectric layer 3013, a second dielectric layer 307, a third dielectric layer 335, a plurality of switching devices 317, an insulating layer 309, a transmissive electrode layer 311, a reflective electrode layer 313, and a plurality of spacers 319. For simplicity, FIG. 3C and FIG. 3D do not show the spacers 319.

Figure 3A:
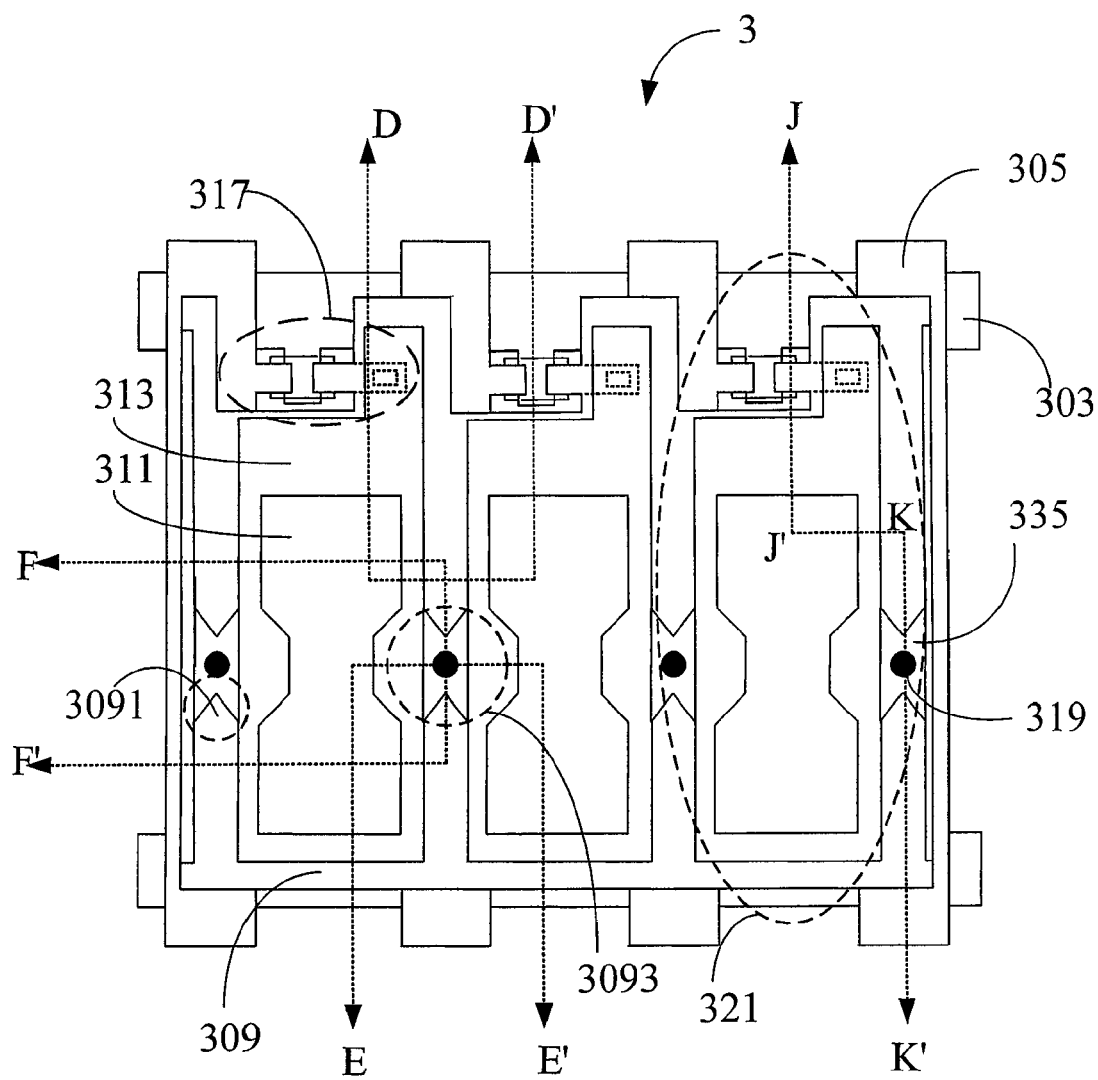
FIG. 3A is a top view of an array substrate of the first embodiment according to the present invention.
Figure 3B:
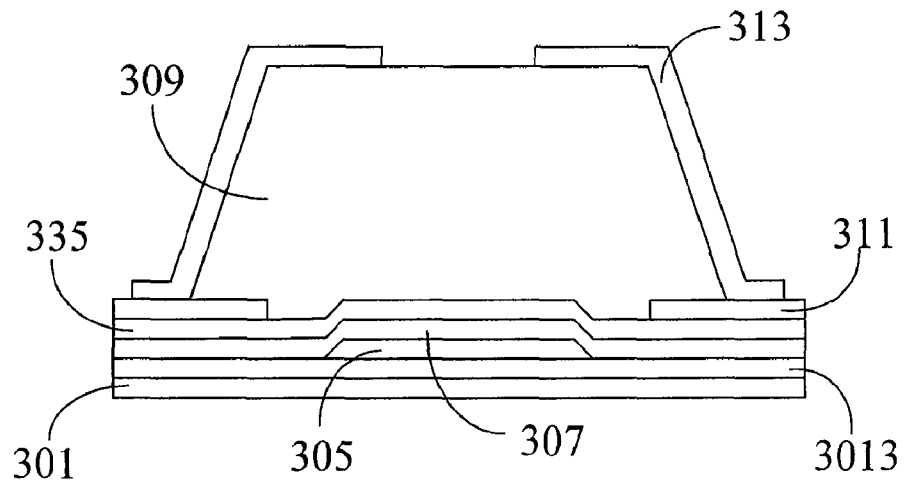
FIG. 3B is a cross-sectional view along line D-D' in the array substrate of FIG. 3A.
Figure 3C:
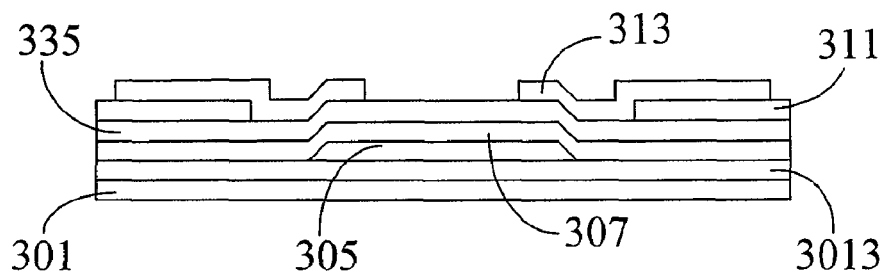
FIG. 3C is a cross-sectional view along line E-E' in the array substrate of FIG. 3A.
Figure 3D:
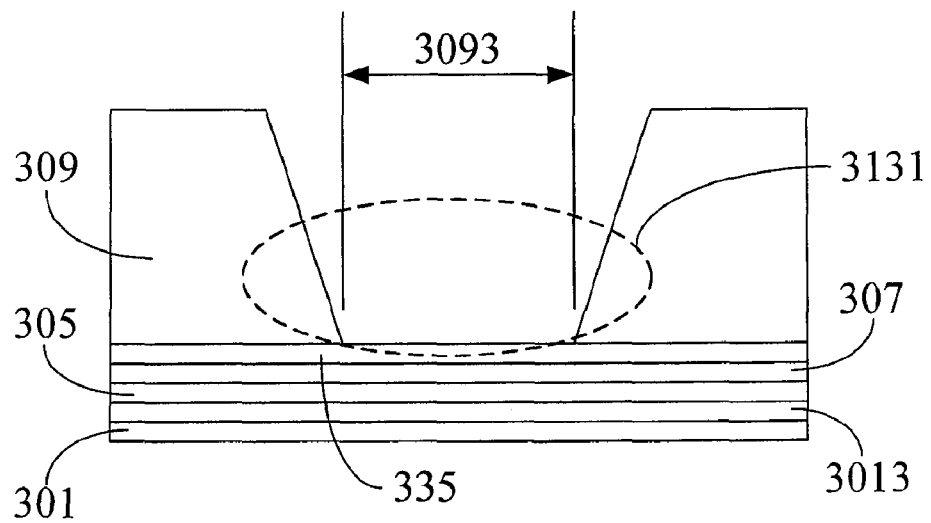
FIG. 3D is a cross-sectional view along line F-F' in the array substrate of FIG. 3A.

As shown in FIG. 3A, the data lines 305 are substantially perpendicular to the scan lines 303. The data lines 305 and the scan lines 303 are located on the first dielectric layer 3013 of the substrate 301. The data lines 305 and the scan lines 303 define a plurality of array pixel areas 321. This embodiment shows three array pixel areas 321 which are defined by two scan lines 303 and four data lines 305. Each array pixel area 321 represents a sub-pixel, and has a transmissive area and a reflective area. However, people skilled in this field may also proceed with a different number of transmissive areas and reflective areas in other embodiments.

As shown in FIG. 3B to FIG. 3D, the first dielectric layer 3013 is deposited above the substrate 301. In this embodiment, the substrate 301, for example, is a glass substrate, while the material of the first dielectric layer 3013 is Ge—$SiN_x$. But in other embodiments, the substrate 301 and the first dielectric layer 3013 also may be made of other materials. The second dielectric layer 307 is deposited above the first dielectric layer 3013, the data lines 305 and the scan lines 303. The third dielectric layer 335 is deposited above the second dielectric layer 307. The third dielectric layer 335 is acting as a passivation layer in this embodiment.

The first dielectric layer 3013, the second dielectric layer 307, and the third dielectric layer 335, which are described before, may be made of organic materials (e.g. a photoresist, polyarylene ether (PAE), polyamides, polyesters, polyalcohols, polyolefins, benzocyclobutene (BCB), hydrogen silsesquioxane (HSQ), methyl silsesquioxane (MSQ), SiOC—H, other materials, or a combination of thereof), inorganic materials (e.g. silicon oxide, silicon nitride, silicon oxynitride, silicon carbide, hafnium oxide, other materials, or a combination thereof), or a combination thereof.

As shown in FIG. 3A, the switching devices 317 are connected to the scan lines 303 and the data lines 305 correspondingly. The switching devices 317 are thin film transistors (TFTs). In this embodiment, the switching device 317 is formed between the reflective electrode layer 313 of the reflective area and the substrate 301 (not shown in FIG. 3A), which may be a top gate structure or a bottom gate structure. In general, the switching device 317 comprises a source, a drain, and a gate (not shown). The source is electrically connected to the reflective electrode layer 313, the drain is electrically connected to the data line 305, and the gate is electrically connected to the scan line 303. For example, in the structure of the bottom gate (not shown), a sub-insulating layer is further disposed on the gate, where the source and the drain are located. Another sub-insulating layer is in turn disposed above the source and the drain.

The insulating layer 309 is deposited above the third dielectric layer 335 which is located above the scan lines 303 and the data lines 305. The insulating layer 309 is substantially distributed along the scan lines 303 and the data lines 305. The insulating layer 309 has a plurality of free ends 3091, wherein a pair of the free ends 3091 faces each other and defines a broken region 3093, as shown in FIG. 3A and FIG. 3D. Each of the free ends 3091 has a tilt down profile with a decreasing width facing the broken region 3093, as shown in FIG. 3 D. Each of the broken regions 3093 is formed above the corresponding data line 305. In this embodiment, the insulating layer 309 may be made of organic materials (e.g. a photoresist, polyarylene ether (PAE), polyamides, polyesters, polyalcohols, polyolefins, benzocyclobutene (BCB), hydrogen silsesquioxane (HSQ), methyl silsesquioxane (MSQ), SiOC—H, other materials, or a combination thereof), inorganic materials (e.g. silicon oxide, silicon nitride, silicon oxynitride, silicon carbide, hafnium oxide, other materials, or a combination thereof), or a combination thereof.

Figure 4A:
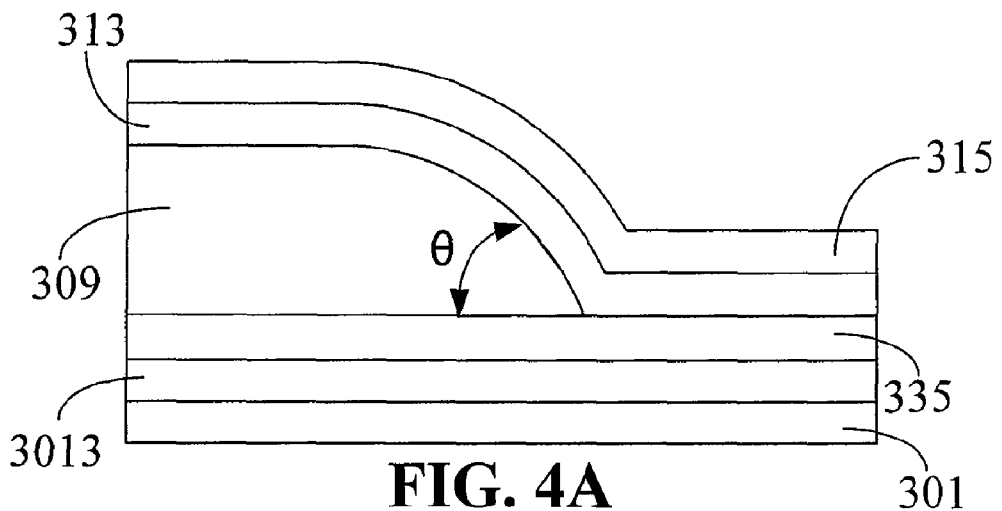
FIG. 4A is a schematic drawing of the applied photoresist according to the first embodiment of the present invention.

The tilt down profile of the free end 3091 of the insulating layer 309 projects a shape on a projection plane and the shape is substantially a triangle. A tilt angle θ is formed between the tilt down profile and the projection plane, as shown in FIG. 4A. The tilt angle θ is substantially 55.11°. But in other embodiments, the tilt angle θ may be substantially less than 63° or more than 55°. In other preferred embodiments, the tilt angle θ may be substantially in a range of 55° to 63°. In this embodiment, the described projection plane is substantially a surface of the third dielectric layer 335.

Additionally, in this embodiment, the aim of the reflective area and the transmissive area to obtain the same optical paths is achieved by the insulating layer 309 based on the characteristic of the transflective type LCD. The insulating layer 309 is only formed in the reflective area so that the two areas differ in thickness by the thickness of the insulating layer 309. Therefore, the optical paths of the reflective area and the transmissive area may be adjusted to be the same since the reflective area can reflect light.

The transmissive electrode layer 311 is located in the transmissive area of the array pixel area 321. The transmissive electrode layer 311 is at least partially located between the insulating layer 309 and the third dielectric layer 335, as shown in FIG. 3B. The transmissive area comprises an electrode made of a transmissive material, which is known as a transparent electrode, i.e. the transmissive electrode layer 311. For example, the transmissive material may be Indium Zinc Oxide (IZO), Aluminum Zinc Oxide (AZO), Cadmium Tin Oxide (CTO), Hafnium Oxide ($HfO_2$), other materials, or a combination thereof.

The reflective electrode layer 313 is located in the reflective area of the array pixel area 321. The reflective electrode layer 313 is deposited above the insulating layer 309, and forms a non-continuous profile 3131 (as shown in FIG. 3D) at the broken region 3093. The reflective area comprises an electrode made of a reflective material, i.e. the reflective electrode layer 313. The reflective electrode layer 313 may be made of a reflective material such as Au, Sn, Cu, Ag, Fe, Pb, Cd, Mo, Hf, Nd, Ti, Ta, other materials, or a combination thereof.

The reflective electrode layer 313 may be a reflecting plate or a reflecting mirror. The reflective electrode layer 313 preferably has a rough surface. The rough surface may be achieved by forming a rough surface with Al bumps or forming a rough surface of the insulating layer 309 before depositing the reflective electrode layer 313 thereon. The rough surface can reflect light uniformly, and therefore increase the reflecting efficiency. A portion of the reflective electrode layer 313 is formed downward through a contact hole (not shown) and penetrates through the insulating layer 309 and the third dielectric layer 335 to connect an under metal layer (not shown).

The spacer 319 is formed in the broken region 3093 and located above the data line 305 of the broken region 3093. The spacer 319 maintains a cell gap between the substrate 301 and an opposing substrate (not shown). The spacer 319 is a photo spacer in this embodiment, but the spacer 319 may be a spheroid or a rod in other embodiments. The material of the spacer 319 may be selected from polymeric materials such as melamine resin, urea, benzoguanamine resin, acrylate, or silica.

Based on the above structure, when producing the array substrate 3, the insulating layer 309 will be deposited above the third dielectric layer 335 in advance. The reflective electrode layer 313 will be deposited above the insulating layer 309, i.e. coating. The following processes are as follows: coating the photoresist 315, exposing the photoresist 315, and patterning the photoresist 315 (as shown in FIG. 4A). Then, developing and removing the unnecessary photoresist 315, etching, and, finally, removing the photoresist 315 in the broken region 3093 (as shown in FIG. 4B) are carried out.

Figure 4B:
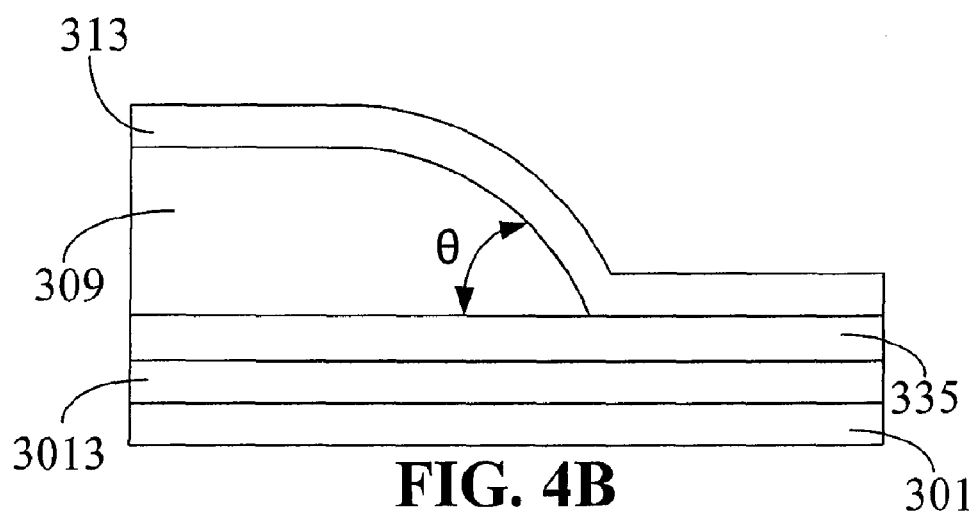
FIG. 4B is a schematic drawing of the removing of the photoresist according to the first embodiment of the present invention.
Figure 4C:
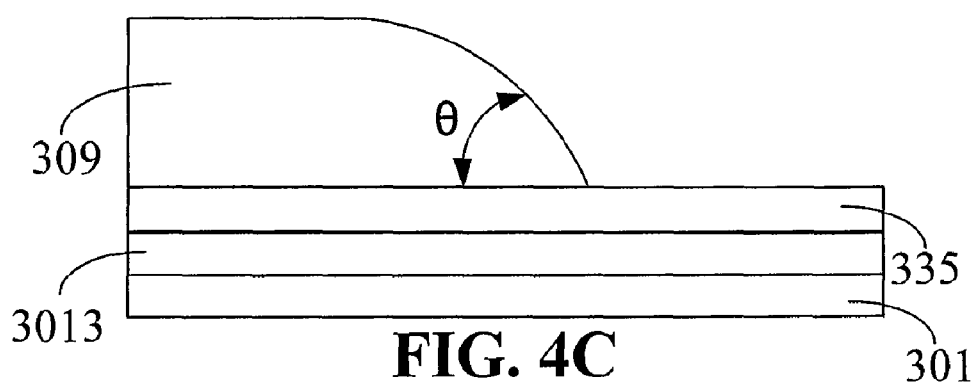
FIG. 4C is a schematic drawing that illustrates no residual reflective electrode after the etching according to the first embodiment of the present invention.

As shown in FIG. 4B, during the process of developing and removing the unnecessary photoresist 315, the desired removing photoresist 315 can be substantially removed with no residual photoresist 315 due to the particular structure, the shape, and the specific angle of the free end 3091. Therefore, the reflective electrode layer 313 won't remain in a region between the two adjacent array pixel areas 321 in the following etching of the reflective electrode layer 313 (as shown in FIG. 4C).

The second embodiment of the invention is also an array substrate 5 adapted for a liquid crystal display device and having a structure approximately similar to the structure of the described first embodiment. The top view and three cross-sectional views of different sections are showing in FIG. 5A, FIG. 5B, FIG. 5C, and FIG. 5D, respectively.

Figure 5A:
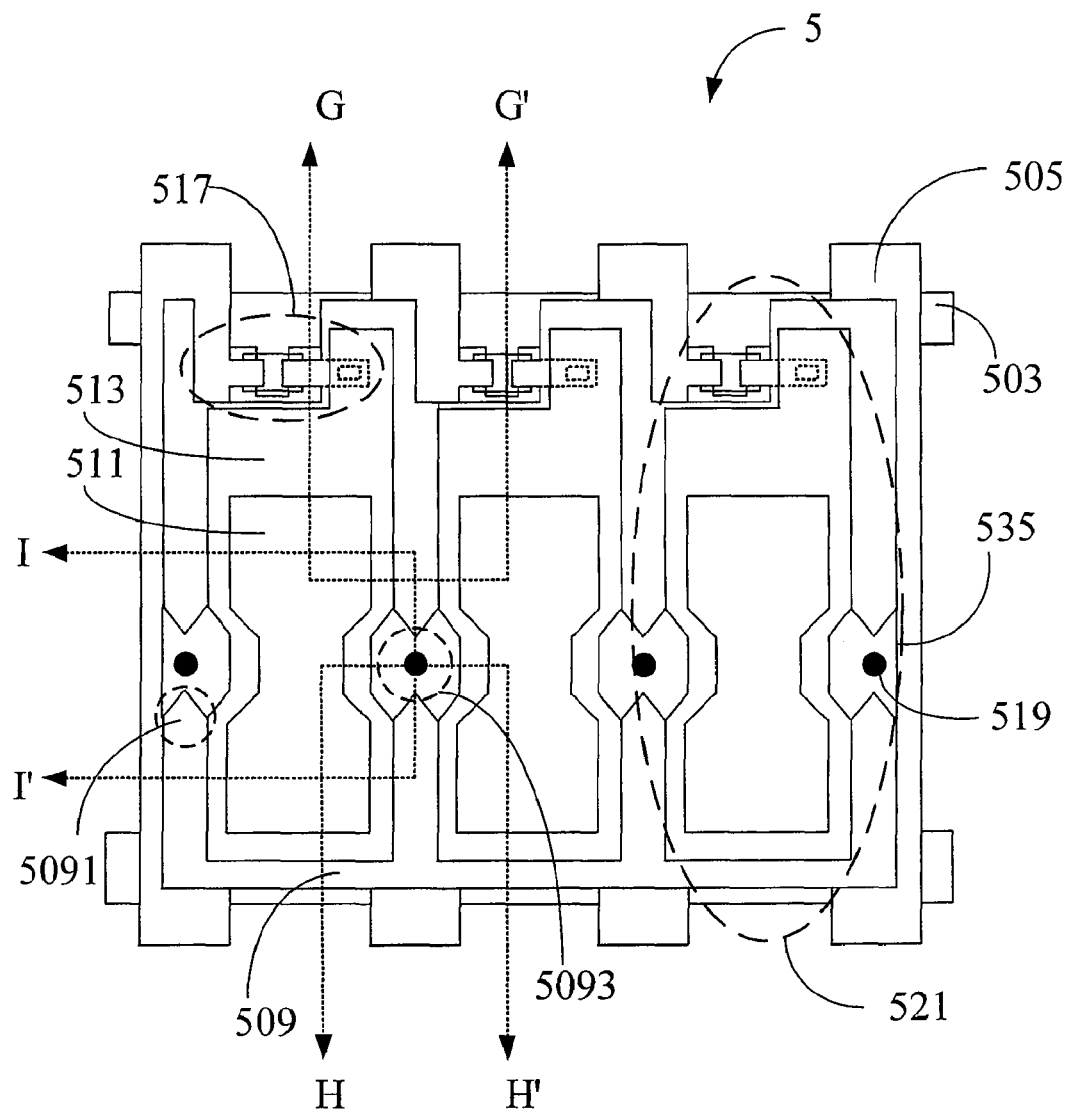
FIG. 5A is a top view of an array substrate of the second embodiment according to the present invention.
Figure 5B:
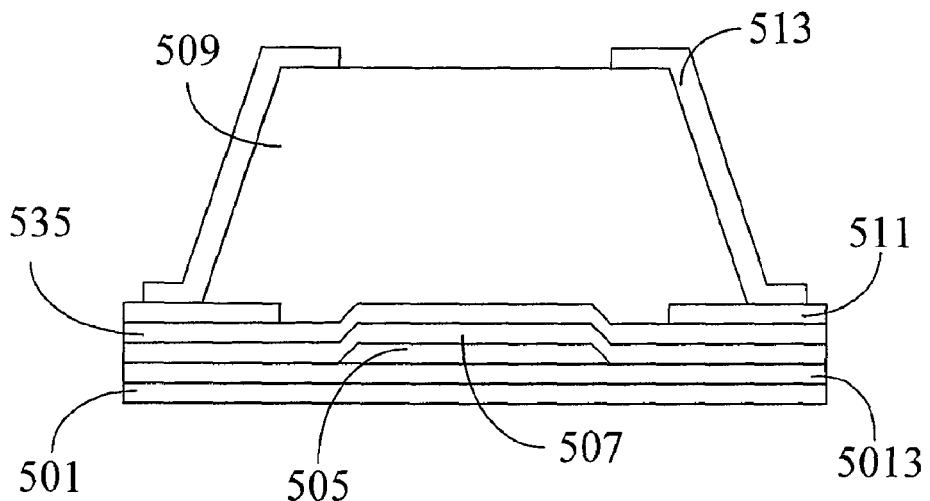
FIG. 5B is a cross-sectional view along line G-G' in the array substrate of FIG. 5A.
Figure 5C:
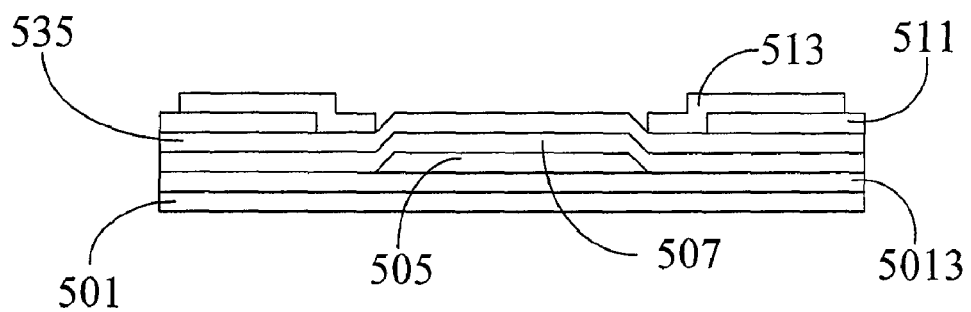
FIG. 5C is a cross-sectional view along line H-H' in the array substrate of FIG. 5A.

The difference between this embodiment and the first embodiment is that the edge of the broken region 5093, which is formed by a pair of the free ends 5091 of the insulating layer 509 of the array substrate 5, is the same width as the data line 505 located in the aforementioned broken region 5093, as shown in FIG. 5A and FIG. 5C. In the array substrate 5 of this embodiment, the reflective electrode layer 513 between the transmissive electrode layer 511 and the broken region 5093 is less than the first embodiment, so that there is no short circuiting between the two adjacent array pixel areas 521.

Figure 5D:
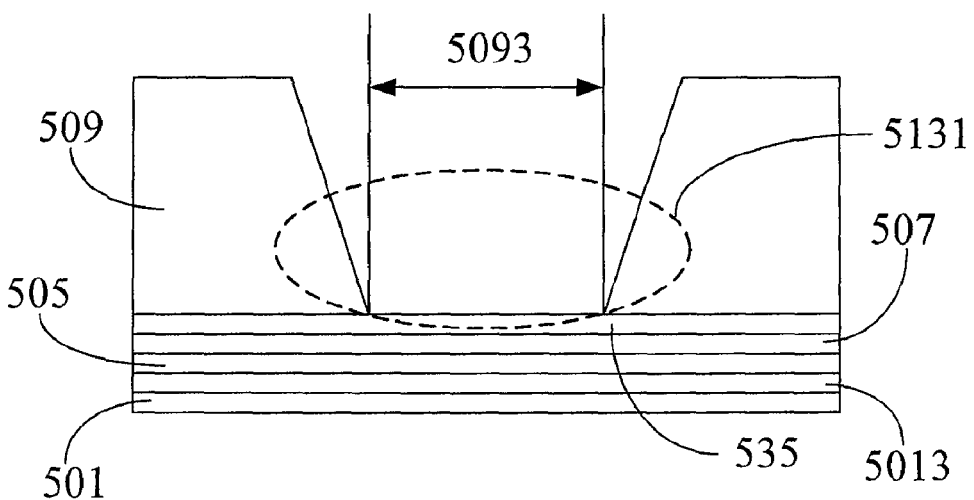
FIG. 5D is a cross-sectional view along line I-I' in the array substrate of FIG. 5A.

More specifically, the described first and second embodiments both provide a plurality of free ends. Each of the free ends has a tilt down profile with a decreasing width (as shown in FIG. 3D and FIG. 5D). When a photoresist is exposed, this tilt down profile can avoid its angle affecting the amount of exposure. As a result, the short circuiting between the two adjacent array pixel areas due to the remained photoresist and reflective electrode layer can be avoided in the following steps of development and removal of the unnecessary photoresist.

Figure 6:
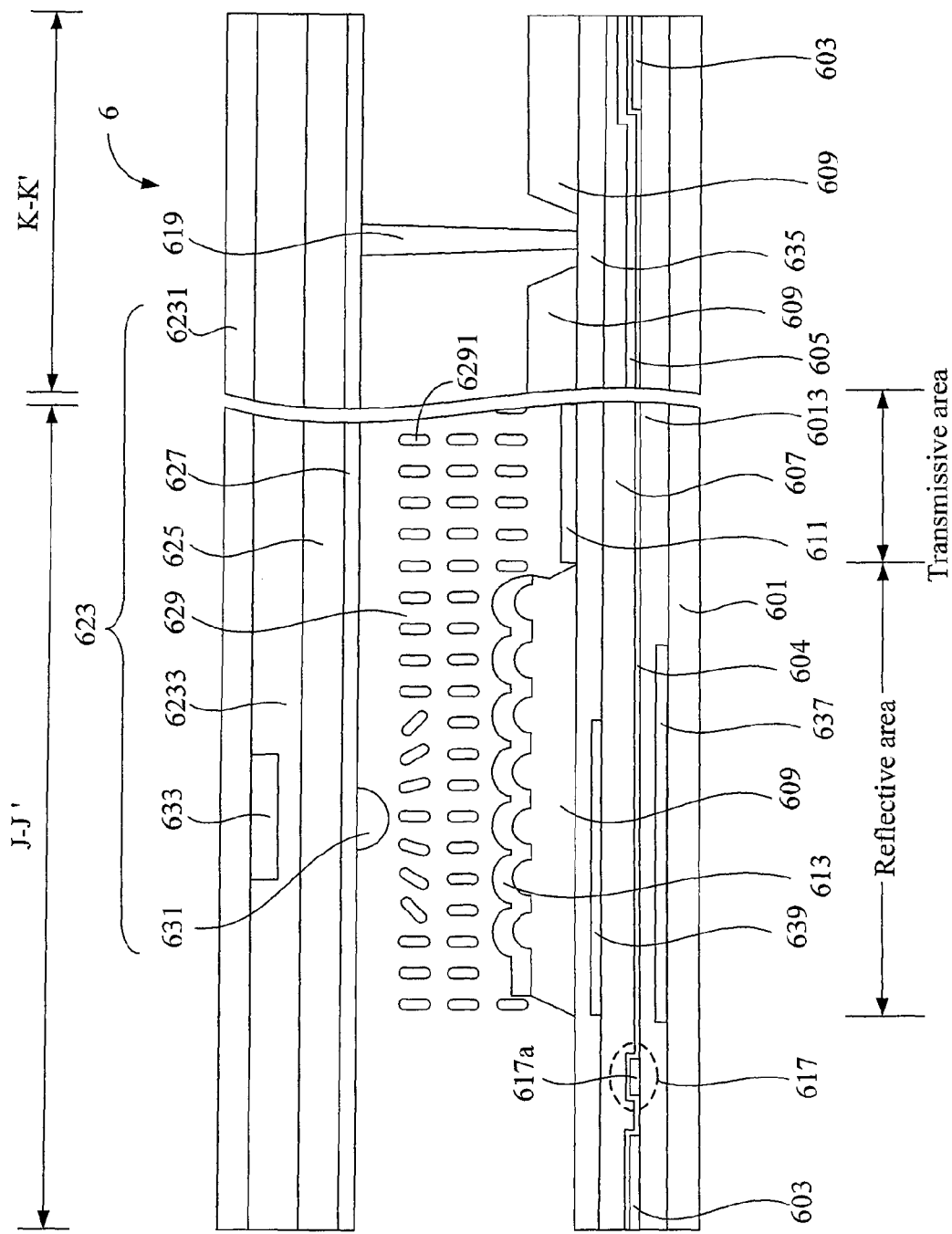
FIG. 6 is a cross-sectional view of a liquid crystal display device of the third embodiment according to the invention along line J-J' and K-K' in the array substrate of FIG. 3A.

As shown in FIG. 6, the third embodiment of the invention is a liquid crystal display device 6. Particularly, it is a transflective type liquid crystal display device 6 comprising a described array substrate, an opposing substrate 623, and a liquid crystal layer 629. The described array substrate is the array substrate 3 in the first embodiment. Thus, FIG. 6 is a cross-sectional view of a liquid crystal display device along line J-J' and K-K' in the array substrate of FIG. 3A, wherein these two cross-sectional views are located on different planes. However, an array substrate of the liquid crystal display device 6 may be the array substrate 5 of the second embodiment or other array substrates with the invention features in other embodiments.

The described array substrate comprises a substrate 601, a plurality of scan lines 603, a first spacing layer 604, a plurality of data lines 605, a second dielectric layer 607, an insulating layer 609, a transmissive electrode layer 611, a reflective electrode layer 613, a plurality of switching devices 617, a plurality of spacers 619, a first dielectric layer 6013, a third dielectric layer 635, a polysilicon layer 637, and a metal layer 639. The detailed structure of the array substrate is described in the first and second embodiments.

The first spacing layer 604 is used to insulate and separate the scan lines 603 and the data lines 605. The first dielectric layer 6013 has a polysilicon layer 637. The switching device 617 of each array pixel is located between the second dielectric layer 607 and the first dielectric layer 6013, wherein FIG. 6 mainly shows a source 617a of the switching device 617. The polysilicon layer 637 is interposed between the substrate 601 and the first dielectric layer 6013. The metal layer 639 is located between the second dielectric layer 607 and the third dielectric layer 635. A portion of the metal layer 639 is formed downward through a via hole (not shown) and penetrates through the second dielectric layer 607 and the first dielectric layer 6013 to connect the polysilicon layer 637.

The insulating layer 609 will be deposited above a portion of the third dielectric layer 635 of the reflective area in advance to compensate for the optical path difference between the transmissive electrode layer 611 and the reflective electrode layer 613. Then, the reflective electrode layer 613 will be deposited above the insulating layer 609. In this embodiment, the insulating layer 609 of the reflective area has a rough surface. Therefore, the reflective electrode layer 613 above the insulating layer 609 has a rough surface to reflect light uniformly, and increases the reflecting efficiency. The reflective electrode layer 613 is formed downward through a contact hole (not shown) of the insulating layer 609 to connect the metal layer 639. Additionally, the transmissive electrode layer 611 is electrically connected (not shown) to the reflective electrode layer 613.

The opposing substrate 623 is disposed opposite to the array substrate 3. The opposing substrate 623 comprises an opposing substrate 6231, a color filter 6233, an overcoat layer 625, a common electrode 627, a plurality of alignment elements 631, and a plurality of black matrixes (BM) 633. The opposing substrate 6231 is also a glass substrate in this embodiment.

The corresponding color filter 6233 of each array pixel area (not shown) is red, green or blue. The array pixel area defines a sub-pixel, and each array pixel comprises three sub-pixels corresponding to these three colors. However, the colors are not limited. Depending on the design requirements, each array pixel may comprise sub-pixels of one color (as described before), two colors, three colors, four colors, five colors, six colors, seven colors, and so on. Besides the red, green, and blue colors, the corresponding colors may further comprise black, white (colorless), brown, amethyst, jacinth, cyan, or other colors in the color coordinate system (CIE).

The overcoat layer 625 is optionally formed between the common electrode 627 and the color filter 6233. Due to the susceptibility of the color filter 6233 to the corrosion of acids and bases and the uneven thickness of the layers of the individual colors, the adding of the overcoat layer 625 can prevent damage to the color filter 6233. The overcoat layer 625 therefore renders the surface of the color filter 6233 to be smoother.

In order to obviate light leakage, the liquid crystal display device 6 of this embodiment further comprises a plurality of black matrixes 633 located above the opposing substrate 6231. The black matrixes 633 are covered by the color filter 6233. But the black matrixes 633 are not limited to this structure, the black matrixes 633 also may be positioned above the color filter 6233 or at other locations. The black matrix 633 may be made of an organic material (e.g. a color photoresist, a multicolor resist stack, or other colored materials), a metal (e.g. Au, Sn, Cu, Ag, Fe, Pb, Cd, Mo, Hf, Nd, Ti, Ta, other materials, nitrides thereof, oxides thereof, alloys thereof, or a combination thereof), or a combination thereof.

The common electrode 627 is located above the spacers 619, the liquid crystal layer 629, and the alignment elements 631. The common electrode 627 is made of an Indium Tin Oxide (ITO) in this embodiment. However, the material is not limited thereto, and the common electrode 627 also may be alternatively made of Indium Zinc Oxide (IZO), Aluminum Zinc Oxide (AZO), Cadmium Tin Oxide (CTO), Hafnium Oxide ($HfO_2$), other materials, or a combination thereof.

Each of the alignment elements 631 is disposed between the two array pixel areas, individually. The alignment elements 631 are conventional protrusions, and may be made of organic materials (e.g. a photoresist, polyarylene ether (PAE), polyamides, polyesters, polyalcohols, polyolefins, benzocyclobutene (BCB), hydrogen silsesquioxane (HSQ), methyl silsesquioxane (MSQ), other materials, or a combination of thereof). However, the materials are not limited thereto. The alignment element 631 also may be made of inorganic materials (e.g. silicon oxide, silicon nitride, silicon oxynitride, silicon carbide, hafnium oxide, other materials, or a combination of thereof), or a combination of an organic material and an inorganic material. The alignment elements 631 are used to orient the liquid crystal molecules 6291 for the purpose of multi-domain vertical alignment.

The spacers 619 are positioned near each other in the liquid crystal layer 629. The spacers 619 are used to separate the downside substrate 601 of the array substrate and the upside opposing substrate 6231. Therefore, the distance between the downside substrate 601 and the upside opposing substrate 6231 may be controlled.

By controlling the cell gap with the spacers 619, the liquid crystal layer 629 may be filled between the downside substrate 601 of the array substrate and the upside opposing substrate 6231. The switching devices 617 are used to receive the signals of the data lines 605 and the scan lines 603, and to control the operation of the liquid crystal layer 629. The liquid crystal layer 629 comprises many liquid crystal molecules 6291. Each of the liquid crystal molecules 6291 near the substrate 601 or the opposing substrate 6231 is substantially perpendicular to a surface of the substrate 601 or the opposing substrate 6231. The liquid crystal molecules 6291 will rotate under the electric field influence of the transmissive electrode layer 611 and the reflective electrode layer 613, and therefore their arrayal direction may be changed. In addition, a portion of the liquid crystal molecules 6291 of the liquid crystal layer 629 near the alignment elements 631 are substantially perpendicular to a surface of the alignment elements 631.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An array substrate adapted for a liquid crystal display device, comprising:
    a substrate;
    a plurality of scan lines and a plurality of data lines, arranged substantially perpendicular to the scan lines, being formed on the substrate to define a plurality of array pixel areas;
    a plurality of switching devices, connected to corresponding scan lines and the data lines; and an insulating layer, formed above the scan lines and the data lines, having a plurality of free ends, wherein a pair of the free ends faces each other and defines a broken region;

wherein each of the pair of free ends has a tilt down profile with a decreasing width facing the broken region; the insulating layer is substantially distributed along the scan lines and the data lines, and the broken region is formed above one of the data lines.

2. The array substrate of claim 1, wherein the tilt down profile projects a shape on a projection plane and the shape on the projection plane is substantially a triangle in plan view.

3. The array substrate of claim 2, wherein a tilt angle formed between the tilt down profile and the projection plane is substantially less than 63°.

4. The array substrate of claim 3, wherein the tilt angle is substantially more than 55°.

5. The array substrate of claim 4, wherein the tilt angle is substantially 55.11°.

6. An array substrate adapted for a liquid crystal display device, comprising:
   a substrate;
   a plurality of scan lines and a plurality of data lines, arranged substantially perpendicular to the scan lines, being formed on the substrate to define a plurality of array pixel areas;
   a plurality of switching devices, connected correspondingly to the scan lines and the data lines;
   an insulating layer, formed above the scan lines and the data lines, having a plurality of free ends, wherein a pair of the free ends faces each other and defines a broken region; and
   a reflective electrode layer being formed above the insulating layer and forming a non-continuous profile at the broken region;
   wherein each of the pair of the free ends has a tilt down profile with a decreasing width facing the broken region.

7. The array substrate of claim 6, further comprising a transmissive electrode layer in the array pixel area, and the transmissive electrode layer being at least partially located under the insulating layer.

8. The array substrate of claim 1, further comprising a transmissive electrode layer at the array pixel, and the transmissive electrode layer being at least partially located under the insulating layer.

9. An array substrate adapted for a liquid crystal display device, comprising:
   a substrate;
   a plurality of scan lines and a plurality of data lines, arranged substantially perpendicular to the scan lines, being formed on the substrate to define a plurality of array pixel areas;
   a plurality of switching devices, connected correspondingly to the scan lines and the data lines;
   an insulating layer, formed above the scan lines and the data lines, having a plurality of free ends, wherein a pair of the free ends faces each other and defines a broken region; and
   a plurality of spacers, wherein one of the spacers is formed in the broken region and located above one of the data lines;
   wherein each of the pair of the free ends has a tilt down profile with a decreasing width facing the broken region.

10. The array substrate of claim 1, wherein the material of the insulating layer comprises an organic material.

11. A liquid crystal display device, comprising:
    an opposing substrate;
    an array substrate of claim 1, disposed opposite to the opposing substrate; and
    a liquid crystal layer, filled between the array substrate and the opposing substrate.

12. The liquid crystal display device of claim 11, wherein the opposing substrate comprises a color filter.

* * * * *